United States Patent [19]

Sandrik et al.

[11] Patent Number: 4,852,139
[45] Date of Patent: Jul. 25, 1989

[54] REDUCTION OF FLICKER DURING VIDEO IMAGING OF CINE PROCEDURES

[75] Inventors: John M. Sandrik, Wauwatosa; Rowland F. Saunders, Waukesha, both of Wis.

[73] Assignee: General Electric Company, Milwaukee, Wis.

[21] Appl. No.: 803,260

[22] Filed: Dec. 2, 1985

[51] Int. Cl.$^4$ .............................................. H05G 1/64
[52] U.S. Cl. ..................................... 378/99; 358/110; 358/111
[58] Field of Search ................ 378/099, 176; 358/111, 358/168, 167, 222, 110

[56] References Cited

U.S. PATENT DOCUMENTS

| 3,974,386 | 8/1976 | Mistretta | 378/099 |
| 3,996,420 | 12/1976 | Geluk | 378/099 |
| 4,058,833 | 11/1977 | Meyer | 358/111 |
| 4,612,572 | 9/1986 | Komatsu et al. | 378/099 |

FOREIGN PATENT DOCUMENTS 2523885 9/1976 Fed. Rep. of Germany ...... 378/099

Primary Examiner—Carolyn E. Fields
Assistant Examiner—David P. Parta
Attorney, Agent, or Firm—James H. Beusse

[57] ABSTRACT

A method and apparatus for use in a medical x-ray imaging system of the type including an x-ray source, an image intensifier tube for providing a momentary x-ray image of a patient exposed to x-rays and a video camera having video processing circuits for providing signals representative of a video image of the x-ray image on the intensifier tube to a video monitor provides a flickerless image presentation on the video monitor when the x-ray exposure repetition rate is different from the field scan rate of the video camera. The apparatus enables this result by sensing initiation of a first x-ray exposure and setting the amplification of the video processing circuits to a first value for obtaining a suitable presentation of the image. The apparatus then scans the image on the video camera to provide a first field of image presentation to the video monitor with the amplification set at the first value. The apparatus then directs initiation of a subsequent scan of the image on the video camera prior to a second x-ray exposure and concurrently increases the amplification of the video processing circuits to a second value such that a second field of image presentation is generated having substantially the same intensity as the first field. Since each field is then presented with the same intensity level, the flicker effect associated with a non-synchronized presentation is avoided.

4 Claims, 2 Drawing Sheets

REDUCTION OF FLICKER DURING VIDEO IMAGING OF CINE PROCEDURES

BACKGROUND OF THE INVENTION

The present invention relates to a medical diagnostic method and apparatus for x-ray image presentation on a video monitor and, more particularly, to a method and apparatus for reducing flicker of an x-ray image on a video monitor when the cine frame rate is different from the video field presentation rate on the video monitor.

In a typical imaging system used for medical diagnostics, primary imaging radiation, such as x-ray radiation which has been intensity modulated by passage through a patient, strikes the input screen of an image intensifier tube where it is converted to an electron latent image. Electrodes contained in the tube minify the image and accelerate the electrons toward a luminescent output screen of the image intensifier tube. An image having increased brightness is produced on the output screen in accordance with the spatial modulation of the x-ray radiation. A television camera and monitor are used to display the image. Frequently, a photographic camera or cine camera is also used to record images of diagnostic interest.

High image quality, as measured by image resolution, contrast, and x-ray photon noise, is very desirable in such applications of the imaging apparatus. However, when the x-ray exposures during cine procedures occur at a rate different from the video field presentation rate of the video monitor, a phenomenon referred to as "flicker" occurs. For example, the typical video system presents to the viewer 60 interlaced images (fields) per second in order to provide a flicker-free display. Cine images may be acquired at 15 to 90 frames per second and these are frequently viewed, and possibly recorded, simultaneously through the video system. In each of these arrangements, the x-ray source which is creating the images to be viewed by exposing a patient to x-ray radiation, is pulsed synchronously with the cine recording rate. Since the video field rate is different than the cine recording rate, the video image appears to flicker. At a recording rate of 60 frames per second, the video image does not flicker since the field presentation on the video monitor occurs at the same rate as image acquisition and exposure repetition rate by the x-ray source.

The flicker effect is most pronounced when using a low lag pick up tube, i.e., one which has a substantially reduced image intensity after a first scan of the image on the camera target. This type of tube is preferred in many applications such as those used in viewing moving structures such as blood vessels since the presentation has the least amount of blur for moving structures. The degree of flicker can be reduced by using a pick up tube with a greater lag so that there is a substantial residual signal to read during a time when an un-illuminated field of the camera target is being read. However, the tube with the greater lag results in objectional blurring.

Before continuing with the description, it is important to note that the flicker effect is created by a difference in intensity between video fields and not from the particular display frame rate of the video monitor. As is well known, the properties of the human eye are such that if the frequency of frame projection on a video monitor is above 15 frames per second, the motion will appear to be continuous. This occurs because the eye retains the image which it receives for a fraction of a second after the image is removed. Therefore, if many views are presented in succession, the persistence of vision will integrate them and give the impression of seeing continuous motion. Frame rates for conventional motion picture projection are usually 24 pictures per second. Even though a frequency of 24 frames per second is rapid enough to allow for continuity of motion, it is not rapid enough to eliminate the flicker effect. This results because the human eye, although it will integrate motion at 24 frames per second, will not totally integrate brightness. In order to overcome the flicker effect, it is necessary to present a sequence of pictures to the eye at equal intensity at a rate faster than 24 frames per second. In motion picture practice, the solution to the flicker effect caused by presentation at 24 frames per second is overcome by showing each frame of a projected image twice before advancing to a next frame. In this manner, the eye sees a frame rate of 48 frames per second. In a television video monitor, the flicker effect is avoided by providing 30 frames per second but by interlacing two fields so as to actually appear to present 60 different images or fields per second. In essence, the television system produces half of a picture in one field of view and the remaining half in a second field. In this manner, the eye is able to integrate the brightness over the interlaced frames and the flicker effect is avoided so long as the brightness of each field interlaced to form a frame is the same.

Based upon the above discussion, it will be apparent that if the exposure repetition rate in the x-ray system is such that the images presented on the television monitor are not of equal brightness, the eye will perceive the difference in brightness as a flicker effect. In a common exposure repetition rate of 30 exposures per second, the camera tube will provide a first image for the first field scan presentation on the video monitor which has a substantially high level of intensity. However, as the camera generates this first video field by scanning the target of the camera tube, the intensity of the image on the tube target is substantially reduced. In most tubes, the residual image on the tube target will be at less than 50% of the original image. Consequently, when the tube target is scanned to generate a second field of view, the intensity of the image presented to the video monitor will be substantially reduced and the eye will detect the reduction as a flicker effect.

There are several different types of camera tubes available each of which has different residual image characteristics as a function of the type of target material used in the camera. One of the solutions to the flicker effect has been to use a camera tube which has a greater lag or residual image so that there is a substantial residual image to read during the scanning of the un-illuminated field. An alternate solution to the problem has been to store the image from the illuminated field in some type of memory and to then display the same image a second time for the second video field. However, image storage devices for performing this function are relatively expensive. In addition, while the image storage device may provide a satisfactory solution at 30 cine frames per second, at 45 frames per second a cine exposure pulse may occur at the beginning of the video field, in the middle or not at all during any one field. If only those fields are displayed for which the exposure took place at the beginning of the field, then the effective video frame rate would be reduced to 20 frames per second and increase the flicker effect.

SUMMARY OF THE INVENTION

Accordingly, it is an object of the present invention to provide an improved x-ray imaging method and apparatus in which the undesired effects of flicker are minimized.

It is another object of the invention to provide an improved method of x-ray imaging in which the effects of flicker are reduced electronically.

It is still another object of the invention to provide an improved method of x-ray imaging in which the effects of flicker can be reduced for different frame rates.

In accordance with the present invention, a method and apparatus is provided for increasing the gain of the image generating system in a video camera during scanning of a field in which only a residual image is present on the target. The invention includes a method and apparatus for detecting presentation of an image on the camera tube and for reducing the gain of the system to a first level for the first scanning of the image on the target of the tube. The invention also detects the scanning of the target when only a residual image is present and increases the gain of the system to a level such that the image presented on the video monitor has the same intensity as the image presented during the initial scan of the target.

BRIEF DESCRIPTION OF THE DRAWINGS

The features of the invention believed to be novel are set forth with particularity in the appended claims. The invention itself, however, both as to its organization and method of operation, together with further objects and advantages thereof, may best be understood by reference to the following description taken in conjunction with the accompanying drawings in which:

DETAILED DESCRIPTION

Figure 1:
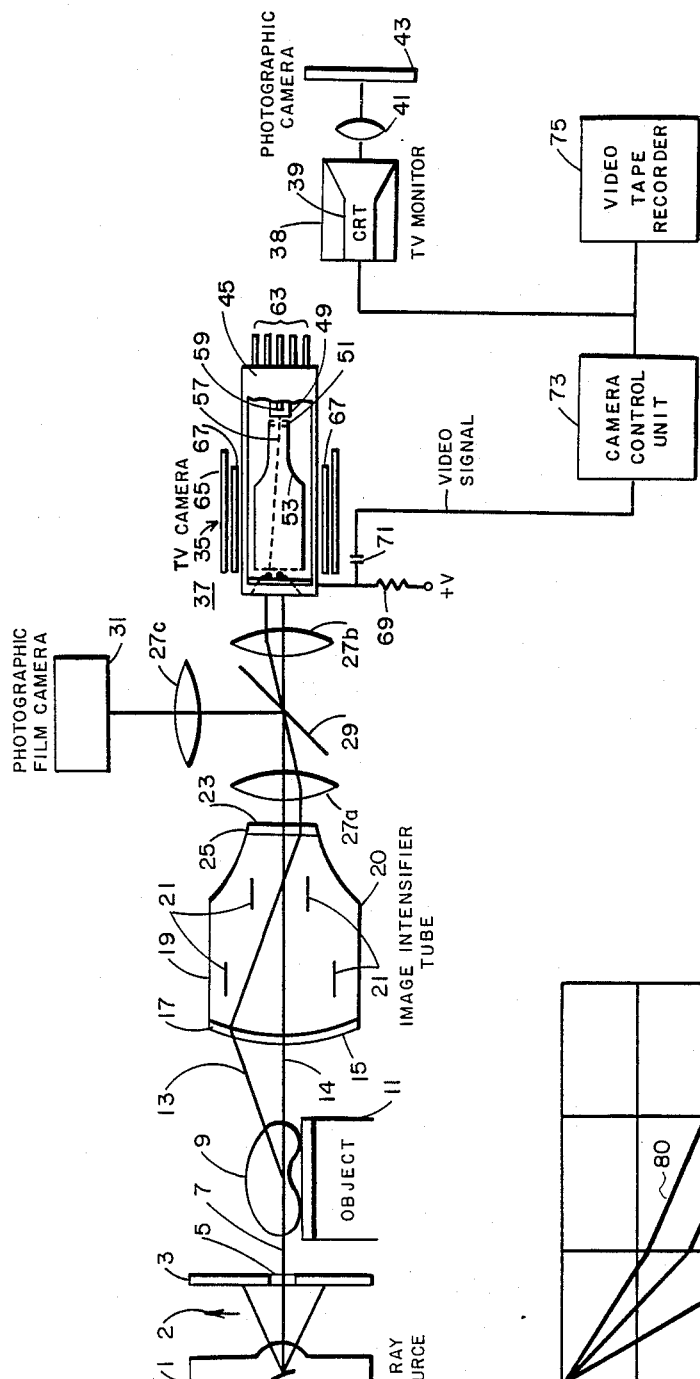
FIG. 1 depicts schematically an imaging apparatus with which the present invention would be useful.

FIG. 1 illustrates schematically the imaging apparatus useful in the practice of the present invention. The apparatus includes an x-ray source 1, a table 11 for supporting a patient 9, an image intensifier tube 19, a conjugate lens pair 27A and 27B, a television camera 37 and a cathode ray tube (CRT) 39 of a television monitor 38 for displaying a television image. A photographic camera 31 is included to photograph directly images produced on an output screen 25 of the image intensifier tube. To this end, a dichroic mirror 29 is provided between lenses 27A and 27B. Mirror 29 is angled to divert a portion of optical wave length radiation toward photographic camera 31, while allowing the remainder of the optical wave length radiation to reach TV camera 37. The imaging apparatus may further include a photographic camera 43 for photographing an image on the CRT with the aid of a lens 41. The apparatus additionally includes an x-ray field limiting device 3 composed of a radiation opaque material, such as lead, having an opening 5 formed therein. Device 3 is positioned between x-ray radiation source 1 and patient 9 and is adapted to collimate the x-ray radiation from x-ray source 1 so as to define the irradiated area of the patient 9.

Image intensifier tube 19 is comprised of an evacuated envelope 20 having a faceplace 15 and an output window 23. Primary x-ray imaging radiation 14 having passed through patient 9 impinges on input screen 17 situated on the inner surface of faceplate 15 where it is converted by a phosphor and photo cathode element (not shown) into an electron latent image. A plurality of internally positioned electrodes, such as electrodes 21, focus and accelerate the electrons toward a fluorescent output screen 25 located within the image intensifier tube adjacent to output window 23 so as to minify and produce an intensified image thereon. The electrons excite the phosphor in the fluorescent screen to emit a quantity of optical wave length photons in proportion to impinging electron energy and density. In this manner, radiation differentially attenuated in accordance with the internal anatomical features of patient 9 is displayed as an optically detectable image at output screen 25.

A television camera pickup tube 35 is provided in television camera 37 to scan images produced on output screen 25 of the image intensifier tube. The camera pickup tube 35 includes an evacuated glass envelope 45 having a polished faceplate 47. A number of control grids 49, 51, 53 and 55 are provided to control electrons emitted by cathode 59. A plurality of pins 63 electrically connected to the various grid elements in a well known manner are also provided at the base of the tube. An electrical coil 67 surrounds the camera tube and, along with the control grids, provides for the focusing of electrons emitted by the cathode into a beam 57 aimed toward a target 61. A series of electrical coils 65 also surround the camera tube and provide for the horizontal and vertical deflection of the electron beam so as to enable the beam to scan target 61. Target 61 is composed of two layers (not shown separately). A first layer is a transparent film of conductive material applied directly to the inside surface of faceplate 47 and forms the signal plate electrode. A second layer composed of a photo conductive material, for example, antimony trisulfide, is deposited over the transparent electrode.

In operation, the transparent electrode is coupled to a source voltage (V) of positive potential relative to cathode 59 through a load resistor 69 so as to create a potential difference across the photo conductive layer. The electrical resistance of the photo conductive layer exhibits a dependence on the intensity of incident light (optical wave length radiation). That is, the higher the intensity of the incident light, the lower resistance of the material. It is beneficial to think of the photo conductive layer as being made up of pixels (picture elements), each consisting of a parallel capacitor/resistor combination. Due to the electric potentials applied to the transparent electrode and cathode, the capacitor in any given pixel is charged to cathode voltage by the scanning electron beam (raster scan). As the intensity of the incident light changes, the conductivity of the resistor changes, thereby discharging the capacitor by an amount proportional to the conductivity of the resistor. It will be apparent, therefore, that the collective positive electrical charge distribution on a target exposed to an optical wave length image, such as that produced on the output screen of the image intensifier tube, corresponds to the intensity of the light incident thereon. The target has an integrating and storing property due to target electric capacitance in that, as the level of light incident thereon varies spacially, the level of charge distribution varies accordingly. The target maintains a given charge distribution, following exposure to optical wave length radiation, thereby creating a latent image.

As known, information (video signals) corresponding to the charge distribution is read out in a line by line scan on the target with electron beam 57 by appropriately energizing horizontal and vertical deflection coil 65. As the electron beam scans across target 61, a current flows in load resistor 69 which is proportional to the spacially incremental stored charge. A video signal voltage is developed across the resistor and may be coupled through a capacitor 71 to a video pre-amplifier (not shown) and then to further amplification and control stages in the camera control unit 73, the output of which is used to drive a CRT in a television monitor and possibly a video recording device 75. It should be noted that scanning the target for the purpose of reading out the image discharges the capacitors to cathode potential and results in the target being erased. Consequently, if the image is not refreshed for a subsequent scan, the second scan of the target will produce an image for display on the CRT in the television monitor which has significantly less intensity than the primary image. In a particular embodiment of this invention, alternation of the amplification occurring in camera control unit 73 is performed to maintain consistent intensity of the displayed image.

Figure 2:
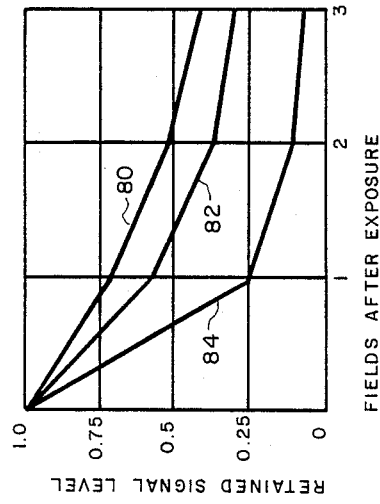
FIG. 2 depicts graphically the signal current fall off characteristics of three types of video pickup tubes.

Referring now to FIG. 2, there is shown a graph of the signal current fall-off characteristics of typical camera pickup tubes illustrating the reduction in latent image on the target of the pickup tube after each of a plurality of scans of the target by an electron beam. The graph illustrates three different characteristics shown as lines 80, 82 and 84 representative, respectively, of three different types of target materials in a video pickup tube. The graph 80 represents a target material having a significant lag and is of the type known as chalcogenide. The graph illustrated at 82 shows a typical selenium arsenide telluride target material having an average decay rate after scanning by an electron beam. The graph at 84 illustrates a target material of lead monoxide which has a very rapid fall off and therefore is more completely erased after a single complete field scan. Even for a camera tube using a target material of chalcogenide as shown by graph 80, the fall off rate or retention level of the image intensity on the target is sufficiently fast that a second scan of the target without refreshing the image will produce a video signal having significant less intensity than that produced during the first scan. Accordingly, if the images are being produced on a standard television format of interlaced fields, the first field will be generated at a relatively high intensity while the second field will be produced at a relatively low intensity. Since the eye is capable of discerning the flicker effect created by the different intensities occurring at a rate of 30 fields per second (since the alternating field will be produced at that rate) the eye will perceive a flicker effect on the video monitor. Such a flicker effect is not only annoying but may also create difficulty for medical personnel in examining the image and in making diagnostic determinations based on that image.

The present invention overcomes the problem of the flicker effect created by a second or further field scan of an image on the target of a pickup tube prior to refreshing the image by controlling the gain of the video amplifier through which the video signal is processed after being derived from the target on the pickup tube. It should be noted at this point that the system disclosed in FIG. 1 is arranged such that the exposure of the patient to x-ray radiation occurs in synchronism with the film frame rate of the photographic film camera 31. Thus, if the film camera 31 is operating at a frame rate of 30 frames per second, the image on the TV camera will only be refreshed at 30 frames per second and thus every other field scan of the TV camera will produce an image that has significantly less intensity on the TV monitor 39 than the image presented from the preceding field scan since the TV camera is operating at a field rate of 60 fields per second even though the actual frame rate is only 30 frames per second.

Figure 3:
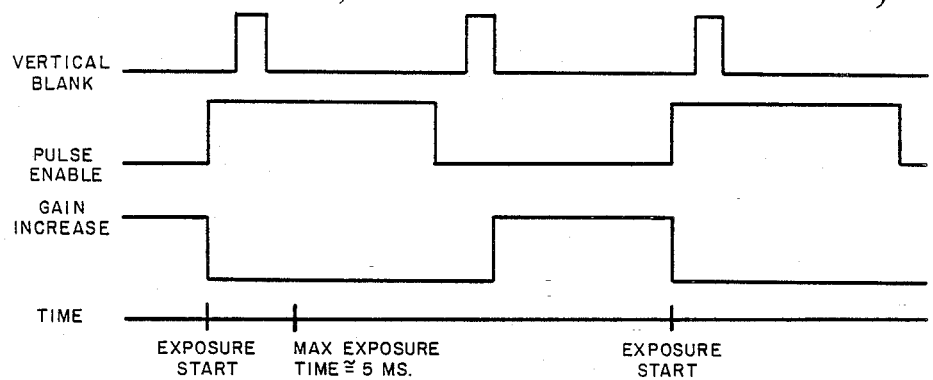
FIG. 3 is a timing diagram for controlling the gain of a video processing circuit in accordance with the present invention.

Turning now to FIG. 3, there is illustrated a timing diagram useful in understanding the operation of the present invention. It will be noted that the first line is a series of vertical blanking signals which occur in the television system for initiating a vertical retrace function to allow each field scan to begin. More particularly, the scan of a field in the TV camera occurs on a line by line basis in which a first field is generated by scanning every other line and a second field is generated by scanning the lines which were not scanned in the first scan. As the complete target is scanned in the TV camera, the electron beam has to be returned from the bottom or lower most portion of the tube back to its starting position at an upper most portion. In order that the retrace of the electron beam across the tube is not apparent to someone observing the reproduced picture on the TV monitor, a vertical blanking signal is generated to blank the video during the vertical retrace function. At the end of the vertical blanking signal, the electron beam is at its starting position and the scanning process on a line by line basis continues.

The graph labeled pulse enable is a sequence of pulses which are applied to the x-ray source 1 to enable it to emit x-ray radiation for creating an image on the image intensifier tube. The pulse enable signals are associated with the photographic film camera 31 such that the frame rate of the photographic film camera is in synchronism with the images produced by the image intensifier tube which are in turn created by the x-ray radiation from x-ray source 1. Although the pulse enable signals are indicated as relatively long time duration signals, it will be appreciated that the actual exposure time to the x-ray radiation is considerably less than the time of the pulse enable signals.

The line labeled "gain increased" represents the implementation of the present invention to vary the gain of the video system in order to compensate for the reduced image intensity during a scan of the target in the TV camera prior to that image on the target being refreshed. Since the pulse enable signal is effective to initiate an exposure, i.e., a pulse of x-ray radiation from source 1, the gain of the video system is appropriately reduced at the start of the pulse enable signal. The gain is maintained at the reduced level throughout the first field scan of the target material in the TV camera 37. At the start of a second field scan, the gain is increased to a level sufficient to produce an image on the TV monitor or more particularly, a video signal to the TV monitor 38 which is of the same magnitude as the video signal produced during the first field scan. The gain is maintained at this level until the start of a second exposure. It is important to note that the gain is reduced prior to the end of the second field scan since the pulse enable signal causes a second exposure to begin prior to the completion of the second field scan and the image on the image intensifier tube faceplate is immediately refreshed as soon as the x-ray radiation begins. Since this information is immediately transferred to the TV camera, the remaining lines of the target to be scanned prior to the end of the first field scan will be at a higher image intensity and will thus not require that the video signals for that portion of the field be processed at a higher gain or amplification. It should also be noted that since the exposure to the x-ray radiation lasts into the time in which the vertical blanking signal is generated, the image which is scanned over the short period corresponding to the last few scan lines of the target will be refreshed immediately after scanning by the image on the image intensifier tube.

Figure 4:
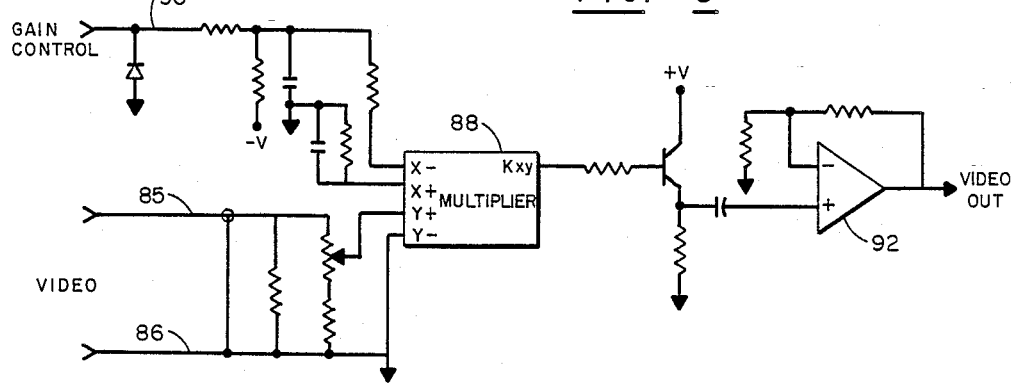
FIG. 4 is a schematic representation of a gain control circuit in a video camera.

Turning now to FIG. 4, there is shown one example of a video camera circuit responsive to a control signal for changing its gain in order to produce a video signal output of different magnitudes. In this system, the video input is connected to the lines 85 and 86 and coupled through a resistor circuit into the Y-input terminals of a multiplier circuit 88. The multiplier circuit is a commercially available device of a type well known in the art. A control signal is applied on a line 90 and coupled into the X-input terminals of the multiplier circuit 88. The multiplier circuit effectively multiplies the video signal on the Y input terminals by the gain control signal on the X input terminals in order to produce a variable amplitude or gain adjusted output video signal. The output video signal is coupled through an operational amplifier to other processing circuitry within the video system, all of a type well known in the art.

Figure 5:
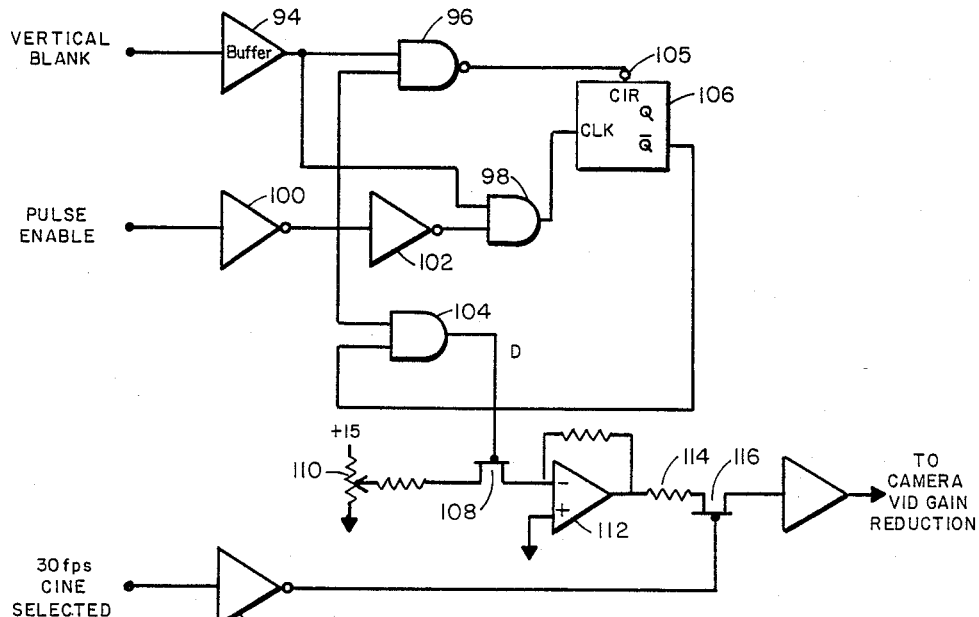
FIG. 5 is a simplified block diagram and partial schematic diagram of a circuit for controlling the gain of the camera system of FIG. 4 in accordance with the present invention.

Referring now to FIG. 5, there is shown a preferred form of circuit for implementing the controlled gain of the video signal amplitude in accordance with the present invention. The vertical blanking signal shown in FIG. 3 is coupled through a buffer amplifier 94 to a first input terminal of an NAND gate 96 and also to a first input terminal of an AND gate 98. The pulse enable signal shown in FIG. 3 is coupled through an inverting buffer amplifier 100 to a second input terminal of an NAND gate 96 and through another inverting buffer amplifier 102 to a second input terminal of AND gate 98. The pulse enable signal is also coupled from inverting buffer amplifier 100 to a first input terminal of an AND gate 104. An output terminal of NAND gate 96 is coupled through an inverter 105 to a clear input terminal of a flip flop 10,6. A clock input terminal of flip flop 106 is connected to an output terminal of AND gate 98. The $\overline{Q}$ output terminal of flip flop 106 is connected to a second input terminal at AND gate 104.

Before continuing with the description of FIG. 5, reference is now made again to FIG. 3 in which there is shown a series of timing diagrams illustrating the operation of that portion of the circuit of FIG. 5 thus far described. The first line illustrates the vertical blanking signals applied to buffer amplifier 94. The second line illustrates the pulse enable signals applied to inverter 100, which produces inverted pulse enable signals. If the vertical blanking signal occurs during the time when an inverted pulse enable signal is at a logical one level, a clear signal will be applied to flip flop 106 which will cause the $\overline{Q}$ output to go high and the Q output to go low. If the vertical blanking pulse occurs during the time that the pulse enable signal is high, a clock signal will be applied from AND gate 98 to flip flop 106 to cause the Q output to go high and the $\overline{Q}$ output to go low. Since the inverted pulse enable signal and the $\overline{Q}$ output of flip flop 106 comprise the input signals to AND gate 104, the output of AND gate 104 will go to a logical one or high level only during the period in which the $\overline{Q}$ output is high and the pulse enable signal is low. This result is indicated by the line marked "gain increases".

Returning now to FIG. 5, the D output of AND gate 104 is supplied to an electronic switch 108 which may be, for example, a field effect transistor. The switch 108 interconnects a reference voltage set by a potentiometer 110 to an inverting input terminal of an operational amplifier 112. The non-inverting input terminal of operational amplifier 112 is connected to ground so that in the absence of a signal on the inverting input terminal, an output terminal of the operational amplifier is held at ground potential. That output terminal of amplifier 112 is connected through a resistor 114 to a second electronic switch 116 which may also be a field effect transistor. The switch 116 interconnects signals from the amplifier 112 to a buffer amplifier 118. Signals generated by amplifier 118 are applied to the gain input terminal connected at line 90 on FIG. 4. The switch 116 is controlled by a signal from the x-ray system indicating that the system is being operated at a rate other than 60 frames per second. For the illustrative embodiment, the system is set to operate at either 30 frames per second or at 60 frames per second. If it is operating at 30 frames per second, i.e., the frame rate of the photographic camera 31 is 30 frames per second, then a signal is provided through an inverting amplifier 120 to a control electrode of the switch 116 to allow it to become conductive whereby the voltage developed at potentiometer 110 may be selectively coupled to the camera electronics to vary its gain. If the system is operating at 60 frames per second where the field scanned by the electron beam in the TV camera, will be refreshed at the beginning of each scan, then the switch 116 is disabled so that the camera gain remains at a constant value.

Although the invention has been described in a system operating at either 60 or 30 frames per second, it will be appreciated that by modification of a logic circuit such as that shown in FIG. 5, the system can be adapted to operate at other frame rates. However, it should be noted that at frame rates in the neighborhood of 15 frames per second, the number of scans necessary between refreshing of the image on the target of the camera tube many be such that considerable noise will be present in the video image. At other frame rates such as for example, 45 frames per second, logic circuit may be somewhat more complicated in that the refresh cycle may occur at different points during the TV raster scan. However, by triggering the gain control features in conjunction with the blanking and pulse enable signals, logic circuits suitable for controlling the gain of the TV camera in conjunction with the exposure rate from the x-ray tube are readily implemented. Thus, although the invention has been described with reference to a particular embodiment and example, other modifications and variations will occur to these skilled in the art in view of the above teachings. Accordingly, it, should be understood that within the scope of the appended claims the invention may be practiced otherwise than is specifically described.

What is claimed is:

1. A method for reducing flicker in a video imaging system in which image presentation to a video camera pickup tube occurs at a rate different than the field scan rate of the video camera, each field scan being initiated by a vertical blanking signal, the imaging system having an electronically controllable gain for varying the magnitude of video signals transferred between the camera pickup tube and a video monitor, the flicker being caused by image intensity variation between sequential field scans, comprising the steps of:

detecting presentation of a first image to the camera pickup tube;
 setting the gain of the imaging system to a first value in response to said step of detecting;
 providing a first field of image presentation to a video monitor with the gain set at the first value;
 sensing initiation of a second field scan of the first image;
 setting the gain of the video imaging system to a second value in response to said step of sensing such that, during said second field scan, a second field of image presentation is generated having an image intensity substantially the same as the image intensity during said first field of image presentation; and
 resetting the gain to said first value for each first field scan upon each subsequent detecting of an image presentation to the camera pickup tube and setting the gain to said second value for each field scan initiated subsequent to the first field scan and prior to a subsequent image presentation.

2. In a medical x-ray system of the type including an x-ray source, an image intensifier tube for providing a momentary x-ray image of an object exposed to x-rays, a camera tube positioned for monitoring the image on the intensifier tube, the camera tube being connected to video processing circuitry for providing video signals representative of the image to a video monitor, apparatus for reducing image flicker on the video monitor when the x-ray exposure repetition rate is different than the video field presentation rate of the video monitor comprising:

means for detecting the exposure repetition rate of the x-ray source and for providing a first gating signal when the exposure repetition rate is different than the video field scan rate of the video camera tube;
 means for detecting initiation of a pulse enable signal for initiating an x-ray exposure;
 means for monitoring video blanking signals in the video camera;
 logic means for combining the pulse enable signal and the video blanking signal and for providing a second gating signal when the video blanking signal occurs in the absence of a pulse enable signal; and
 means responsive to the common presence of the first and second gating signals for increasing the amplification of the video signals.

3. A method for avoiding visually observable flicker of an image on a video monitor used for observation of an x-ray image produced by a medical x-ray imaging system of the type in which repetitive x-ray exposures are made, the number of x-ray exposures per unit of time being different than the rate at which image fields are generated on the video monitor, the video image on the video monitor constituting a single frame comprising two sequentially generated interlaced image fields, each field being formed by electron beam scanning of an image produced on a target of a video camera tube, the method comprising the steps of:

sensing initiation of a first x-ray exposure;
 setting, in response to the sensed exposure initiation, a first value of signal amplification for the video monitor such that a predetermined video image intensity for a first video image field occurring immediately following the x-ray exposure initiation is established;
 sensing initiation of a second video image field after the first x-ray exposure and prior to a second x-ray exposure;
 setting, in response to the second video image field initiation, a second value of signal amplification for the video monitor such that said predetermined video image intensity is again established for the second image field, such that each of the image fields appear at the same predetermined image intensity such that image flicker caused by differences in image intensity of interlaced fields creating a single image frame is avoided; and
 resetting the signal amplification to the first value at each initiation of an x-ray exposure.

4. The method of claim 3 wherein the step of setting a second value of amplification occurs in response to detection of a vertical blanking signal in the video monitor.

* * * * *